US010860837B2

(12) United States Patent
Ranjan et al.

(10) Patent No.: US 10,860,837 B2
(45) Date of Patent: Dec. 8, 2020

(54) DEEP MULTI-TASK LEARNING FRAMEWORK FOR FACE DETECTION, LANDMARK LOCALIZATION, POSE ESTIMATION, AND GENDER RECOGNITION

(71) Applicant: UNIVERSITY OF MARYLAND, COLLEGE PARK, College Park, MD (US)

(72) Inventors: Rajeev Ranjan, College Park, MD (US); Vishal M. Patel, Silver Spring, MD (US); Ramalingam Chellappa, Potomac, MD (US); Carlos D. Castillo, Silver Spring, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 15/746,237

(22) PCT Filed: Jul. 20, 2016

(86) PCT No.: PCT/US2016/043172
§ 371 (c)(1),
(2) Date: Jan. 19, 2018

(87) PCT Pub. No.: WO2017/015390
PCT Pub. Date: Jan. 26, 2017

(65) Prior Publication Data
US 2018/0211099 A1    Jul. 26, 2018

Related U.S. Application Data

(60) Provisional application No. 62/194,598, filed on Jul. 20, 2015, provisional application No. 62/258,788, filed on Nov. 23, 2015.

(51) Int. Cl.
*G06K 9/00* (2006.01)
*G06K 9/62* (2006.01)
(Continued)

(52) U.S. Cl.
CPC ..... *G06K 9/00281* (2013.01); *G06K 9/00248* (2013.01); *G06K 9/6267* (2013.01); *G06K 9/036* (2013.01); *G06K 9/4628* (2013.01)

(58) Field of Classification Search
CPC .......... G06K 9/00281; G06K 9/00248; G06K 9/6267; G06K 9/036; G06K 9/4628
See application file for complete search history.

(56) References Cited

U.S. PATENT DOCUMENTS

| 6,919,892 B1 * | 7/2005 | Cheiky | G06T 13/40 345/473 |
| 7,027,054 B1 * | 4/2006 | Cheiky | G06T 13/40 345/473 |

(Continued)

FOREIGN PATENT DOCUMENTS

WO    WO2014/068567 A1    5/2014

OTHER PUBLICATIONS

Shahbaz, F. "Five Powerful CNN Architectures" Data Driven Investor—Medium—Nov. 11, 2018 pp. 1-32.*

(Continued)

*Primary Examiner* — Mia M Thomas
(74) *Attorney, Agent, or Firm* — Squire Pattons Boggs (US) LLP

(57) ABSTRACT

Various image processing may benefit from the application deep convolutional neural networks. For example, a deep multi-task learning framework may assist face detection, for example when combined with landmark localization, pose estimation, and gender recognition. An apparatus can include a first module of at least three modules configured to (Continued)

generate class independent region proposals to provide a region. The apparatus can also include a second module of the at least three modules configured to classify the region as face or non-face using a multi-task analysis. The apparatus can further include a third module configured to perform post-processing on the classified region.

8 Claims, 8 Drawing Sheets

(51) Int. Cl.
*G06K 9/46* (2006.01)
*G06K 9/03* (2006.01)

(56) References Cited

U.S. PATENT DOCUMENTS

| | | | | |
|---|---|---|---|---|
| 8,396,262 | B2* | 3/2013 | Aisaka | G06K 9/00261 340/5.83 |
| 8,897,504 | B2* | 11/2014 | Steinberg | G06K 9/00208 382/118 |
| 9,122,931 | B2* | 9/2015 | Peng | G06T 11/60 |
| 9,176,987 | B1* | 11/2015 | Peng | G06K 9/6269 |
| 9,275,309 | B2* | 3/2016 | Iliadis | G06K 9/66 |
| 9,430,697 | B1* | 8/2016 | Iliadis | G06K 9/00221 |
| 9,830,529 | B2* | 11/2017 | Jetley | G06K 9/4671 |
| 9,836,484 | B1* | 12/2017 | Bialynicka-Birula | G06F 16/51 |
| 10,089,556 | B1* | 10/2018 | Xu | G06K 9/00771 |
| 10,346,969 | B1* | 7/2019 | Raghu | G01N 21/8851 |
| 2005/0139782 | A1* | 6/2005 | Nagahashi | G06K 9/00228 250/459.1 |
| 2005/0180627 | A1* | 8/2005 | Yang | G06K 9/00228 382/159 |
| 2006/0110040 | A1* | 5/2006 | Simard | G06K 9/00422 382/181 |
| 2008/0155627 | A1* | 6/2008 | O'Connor | H04N 7/173 725/109 |
| 2010/0007665 | A1* | 1/2010 | Smith | G06T 13/40 345/473 |
| 2010/0172287 | A1* | 7/2010 | Krieter | H04W 8/005 370/328 |
| 2011/0222724 | A1* | 9/2011 | Yang | G06K 9/00248 382/103 |
| 2012/0237109 | A1* | 9/2012 | Rajpoot | G06T 7/0012 382/134 |
| 2015/0286638 | A1* | 10/2015 | Li | G06K 9/00268 382/190 |
| 2016/0180195 | A1* | 6/2016 | Martinson | G06N 3/0472 382/103 |
| 2017/0351909 | A1* | 12/2017 | Kaehler | G06K 9/00281 |
| 2018/0032828 | A1* | 2/2018 | Wang | G06K 9/00255 |
| 2018/0144746 | A1* | 5/2018 | Mishra | G10L 25/51 |
| 2018/0189581 | A1* | 7/2018 | Turcot | G06K 9/4628 |
| 2018/0268202 | A1* | 9/2018 | Yu | G06K 9/00208 |
| 2018/0330466 | A1* | 11/2018 | Basso | G06T 1/20 |
| 2018/0336464 | A1* | 11/2018 | Karras | G06K 9/6274 |
| 2018/0357501 | A1* | 12/2018 | Ma | G06K 9/00906 |
| 2019/0087686 | A1* | 3/2019 | Du | G06K 9/629 |
| 2019/0102603 | A1* | 4/2019 | Du | G06N 20/00 |
| 2019/0188567 | A1* | 6/2019 | Yao | G06N 3/04 |

OTHER PUBLICATIONS

Krizhevsky et al. "ImageNet Classification with Deep Convolutional Neural Networks" (Jan. 2016) pp. 1-9.*

International Search Report and Written Opinion dated Sep. 22, 2016 corresponding to International Application No. PCT/US2016/043172.

Pouya Samangouei et al., "Convolutional Neural Networks for Attribute-based Active Authentication on Mobile Devices", IEEE 8th International Conference, Sep. 2016, Published in Biometrics Theory Applications and Systems (BTAS).

Rajeev Ranjan et al., "HyperFace: A Deep Multi-task Learning Framework for Face Detection, Landmark Localization, Pose Estimation, and Gender Recognition", IEEE Transactions on Pattern Analysis and Machine Intelligence, vol. XX, No. XX, 2016, Mar. 3, 2016 (Version 1).

Rajeev Ranjan et al., "A Deep Pyramid Deformable Part Model for Face Detection", IEEE 7th International Conference, Sep. 2015, Published in Biometrics Theory Applications and Systems (BTAS).

* cited by examiner

Algorithm 1 Iterative Region Proposals

1: boxes ← *selective_search*(image)
2: scores ← *get_hyperface_scores*(boxes)
3: detected_boxes ← boxes(*scores* ≥ *threshold*)
4: new_boxes ← detected_boxes
5: for stage = 1 to T do
6:     fids ← *get_hyperface_fiducials*(new_boxes)
7:     new_boxes ← *FaceRectCalculator*(fids)
8:     deteced_boxes ← [deteced_boxes|new_boxes]
9: end
10: final_scores ← *get_hyperface_scores*(detected_boxes)

Figure 3

Algorithm 2 Landmarks-based NMS

1: Get detected_boxes from Algorithm 1
2: fids ← $get\_hyperface\_fiducials($detected_boxes$)$
3: precise_boxes ← $[min_x, min_y, max_x, max_y]($fids$)$
4: faces ← $nms($precise_boxes$, overlap)$
5: for each face in faces do
6:     top-k_boxes ← Get top-k scoring boxes
7:     final_fids ← $median(fids($top-k_boxes$))$
8:     final_pose ← $median(pose($top-k_boxes$))$
9:     final_gender ← $median(gender($top-k_boxes$))$
10:     final_visibility ← $median(visibility($top-k_boxes$))$
11:     final_bounding_box ← $FaceRectCalculator($final_fids$)$
12: end

Figure 4

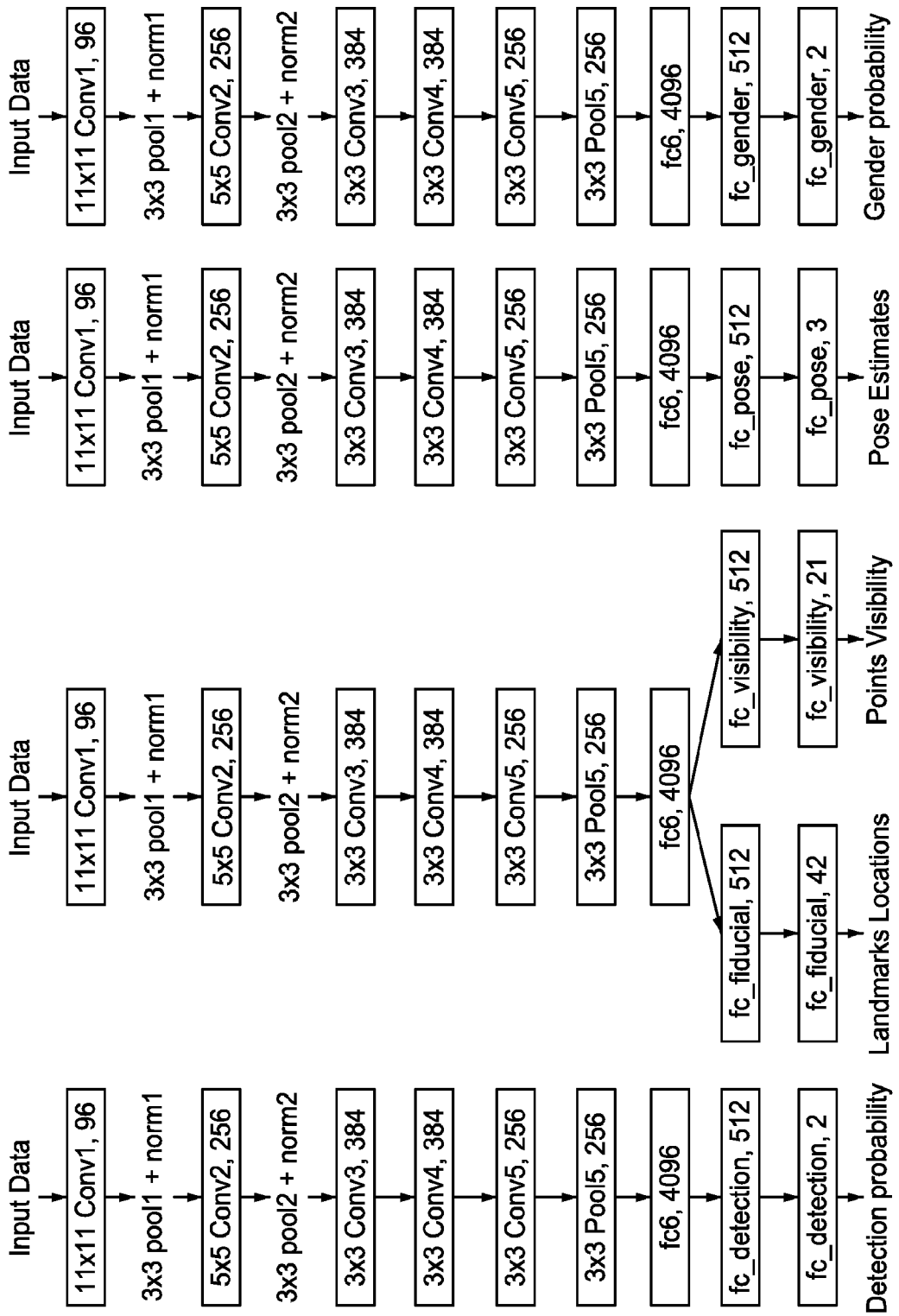

DEEP MULTI-TASK LEARNING FRAMEWORK FOR FACE DETECTION, LANDMARK LOCALIZATION, POSE ESTIMATION, AND GENDER RECOGNITION

CROSS-REFERENCE TO RELATED APPLICATIONS

This application is related to and claims the benefit and priority of U.S. Provisional Patent Application No. 62/194,598 filed Jul. 20, 2015, for "A Deep Pyramid Deformable Part Model for Face Detection," the entirety of which is hereby incorporated herein by reference. This application is also related to and claims the benefit and priority of U.S. Provisional Patent Application No. 62/258,788 filed Nov. 23, 2015, for "Hyperface: A Deep Multi-task Learning Framework for Face Detection, Landmark Localization, Pose Estimation, and Gender Recognition," the entirety of which is hereby incorporated herein by reference.

GOVERNMENT LICENSE RIGHTS

This invention was made with government support under 201414071600012 awarded by IARPA. The government has certain rights in the invention.

BACKGROUND

Field

Various image processing may benefit from the application deep convolutional neural networks. For example, a deep multi-task learning framework may assist face detection, for example when combined with landmark localization, pose estimation, and gender recognition.

Description of the Related Art

Detection and analysis of faces is a challenging issue in computer vision, and has been actively researched for its extensive applications on face verification, face tracking, person identification, and so on. Although recent methods based on deep convolutional neural networks (CNN) have achieved results for face detection tasks it is still conventionally difficult to obtain facial landmark locations, head pose estimates and gender information from face images containing extreme pose, illumination and resolution variations. The tasks of face detection, landmark localization, pose estimation and gender classification have generally been solved as separate problems.

SUMMARY

According to certain embodiments, an apparatus can include a first module of at least three modules. The first module can be configured to generate class independent region proposals to provide a region. The apparatus can also include a second module of the at least three modules configured to classify the region as face or non-face using a multi-task analysis. The apparatus can additionally include a third module configured to perform post-processing on the classified region.

In certain embodiments, an apparatus can include at least one processor and at least one memory including computer program instructions. The at least one memory and the computer program instructions can be configured to select a set of data for facial analysis. The at least one memory and the computer program instructions can also be configured to apply the set of data to a network comprising at least three modules. A first module of the at least three modules can be configured to generate class independent region proposals to provide a region. A second module of the at least three modules can be configured to classify the region as face or non-face using a multi-task analysis. A third module of the at least three modules can be configured to perform post-processing on the classified region.

A method, according to certain embodiments, can include selecting a set of data for facial analysis. The method can also include applying the set of data to a network comprising at least three modules. A first module of the at least three modules can be configured to generate class independent region proposals to provide a region. A second module of the at least three modules can be configured to classify the region as face or non-face using a multi-task analysis. A third module of the at least three modules can be configured to perform post-processing on the classified region.

An apparatus, in certain embodiments, can include means for selecting a set of data for facial analysis. The apparatus can also include means for applying the set of data to a network comprising at least three modules. A first module of the at least three modules can be configured to generate class independent region proposals to provide a region. A second module of the at least three modules can be configured to classify the region as face or non-face using a multi-task analysis. A third module of the at least three modules can be configured to perform post-processing on the classified region.

BRIEF DESCRIPTION OF THE DRAWINGS

For proper understanding of the invention, reference should be made to the accompanying drawings, wherein:

FIG. 3 illustrates pseudo-code of a recursive or iterative region proposal, according to certain embodiments.

FIG. 4 illustrates pseudo-code of landmarks-based non-maximum suppression (NMS), according to certain embodiments.

FIG. 5a illustrates an R-CNN-based network architecture for face detection, according to certain embodiments.

FIG. 5b illustrates an R-CNN-based network architecture for landmark localization, according to certain embodiments.

FIG. 5c illustrates an R-CNN-based network architecture for pose estimation, according to certain embodiments.

FIG. 5d illustrates an R-CNN-based network architecture for gender recognition, according to certain embodiments.

DETAILED DESCRIPTION

Figure 1:
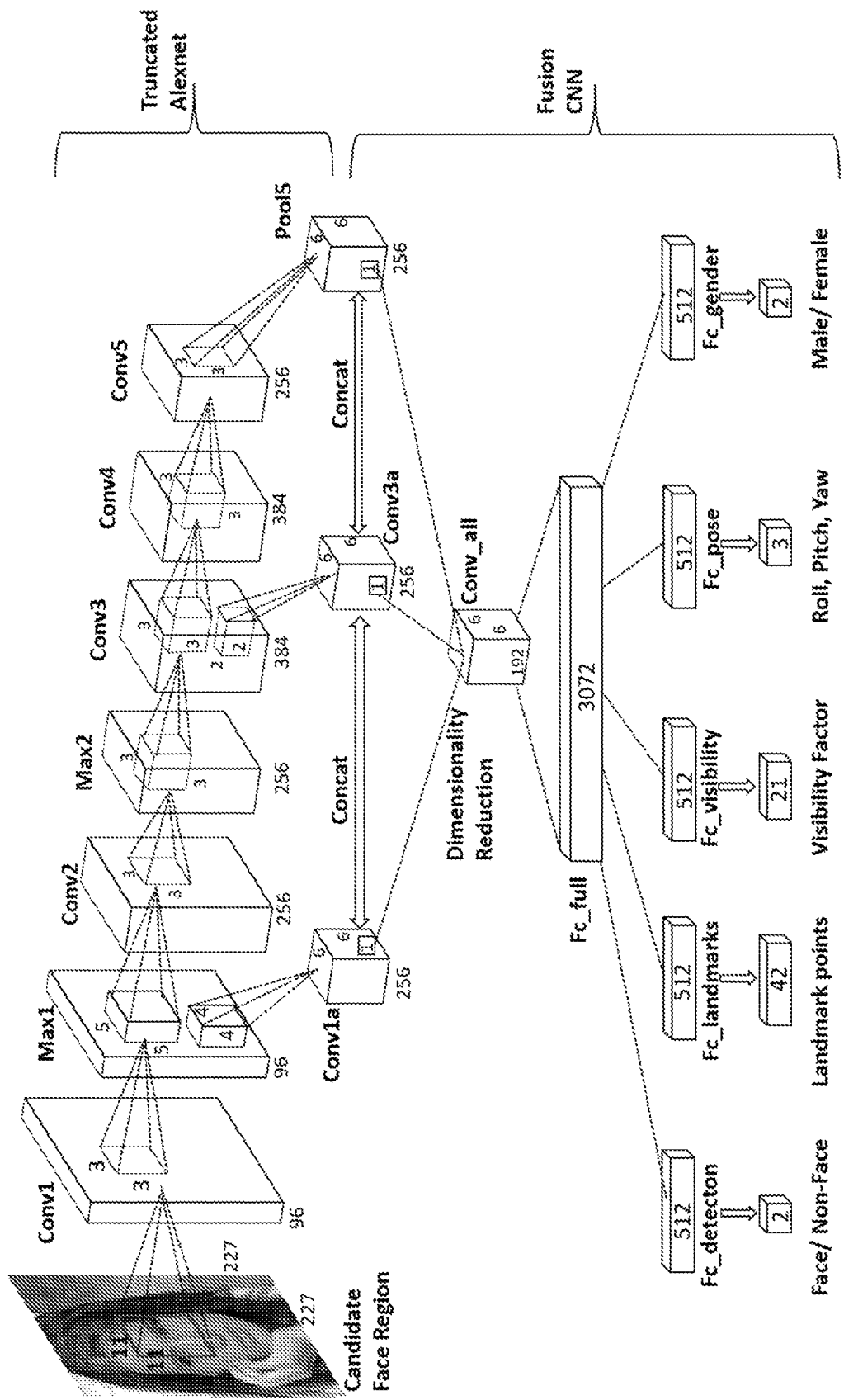
FIG. 1 illustrates a hypernet architecture, according to certain embodiments.

Certain embodiments provide for simultaneous face detection, landmarks localization, pose estimation and gender recognition using deep convolutional neural networks (CNN). This approach, which can be referred to as Hyperface, can fuse the intermediate layers of a deep CNN using a separate CNN and can train multi-task loss on the fused features. For example, a multi-task leaning algorithm can operate on the fused features. Certain embodiments can exploit the synergy among the tasks, which can boost their individual performances. Certain embodiments can capture both global and local information of faces and can outperform conventional approaches for each of those four tasks.

In certain embodiments, therefore, a framework can be based on CNNs and can provide simultaneous face detection, facial landmark localization, head pose estimation and gender recognition from a given image. A CNN architecture can learn common features for these tasks and build the synergy among them. Information contained in features can be hierarchically distributed throughout the network. Lower layers can respond to edges and corners, and hence can contain better localization features. These layers may be more suitable for learning landmark localization and pose estimation tasks. On the other hand, higher layers can be class-specific and suitable for learning complex tasks, which may be suitable for face detection and gender recognition. All the intermediate layers of a deep CNN can be used in order to train different tasks under consideration. The set of intermediate layer features can be referred to as hyperfeatures.

A CNN architecture can contain multiple layers with hundreds of feature maps in each layer. The overall dimension of hyperfeatures may be too large to be efficient for learning multiple tasks. Moreover, the hyperfeatures may need to be associated in a way that they efficiently encode the features common to the multiple tasks. This can be handled using feature fusion techniques. Features fusion can transform the features to a common subspace where they can be combined linearly or non-linearly.

In certain embodiments, a separate fusion-CNN is provided to fuse the hyperfeatures. In order to learn the tasks, the deep CNN and the fusion CNN can be trained simultaneously using multiple loss functions. In this way, the features can get better understanding of faces, which can lead to improvements in the performances of the individual tasks. The deep CNN combined with the fusion-CNN can undergo learning together end-to-end. Since the network performs hyperfeatures fusion, it can be referred to as a hypernet.

The CNN architecture in certain embodiments can perform the multiple tasks of face detection, landmarks localization, pose estimation and gender recognition. Moreover, there can be two post-processing methods: recursive region proposal and landmark-based non-maximum separation, each of which can leverage the multitask information obtained from the CNN to improve the overall performance. Certain embodiments may provide improved performances on challenging unconstrained datasets for all of these four tasks.

FIG. 1 illustrates a hypernet architecture, according to certain embodiments. A single CNN model, such as a hypernet, can provide simultaneous face detection, landmark localization, pose estimation and gender classification. The network architecture can be deep in both vertical and horizontal directions. FIG. 1 can be understood in view of a brief overview of the system pipeline and discussion of the different components in this pipeline in detail.

Figure 2:
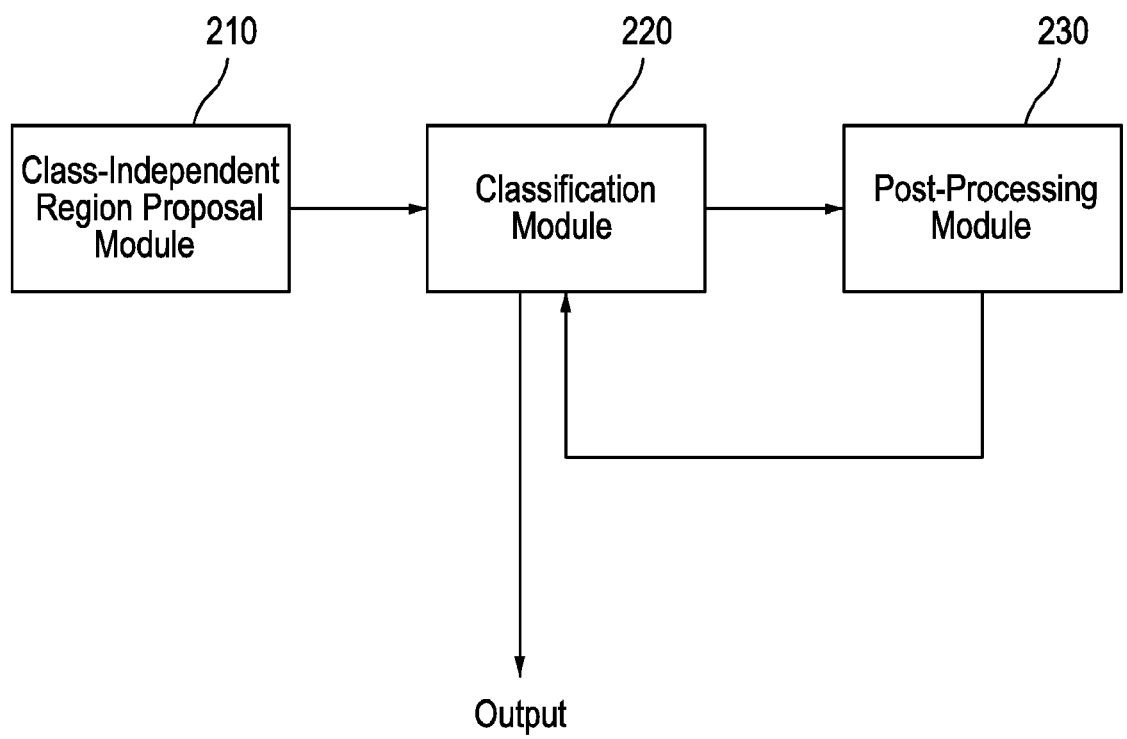
FIG. 2 illustrates a modular system according to certain embodiments.

FIG. 2 illustrates a modular system according to certain embodiments. Three modules can be employed in certain embodiments. The first module, module 210, can generate class independent region-proposals from a given image and can scale them to a predetermined size, such as 227×227 pixels. This module can be variously implemented as a software module running on hardware. The module can be located on a same computer as the other modules or on a different computer. The computer hardware running module 210, and each of the other modules, can include at least one processor and at least one memory. The at least one memory can include computer program code. The at least one memory and the computer program code can be configured to, with the at least one processor, cause the system to carry out the functions associated with the corresponding module. The software to implement the module can be any region selection mechanism, including any conventional region selection mechanism.

An example of a region selection mechanism is a sliding window mechanism that proposes overlapping windows as successive potential regions. This approach may be considered an example of an exhaustive search. Additional criteria may be included in this module, such as thresholds of difference amounts within a region. Thus may avoid, for example, suggesting a region that is a single color as a candidate region to be a face. The region sizes may vary as well. For example, a first proposal may be the entire image, to capture the case of a so-called selfie. Subsequent proposals may suggest smaller and smaller candidate regions to capture faces occupying decreasingly smaller portions of the image. The smaller and smaller regions may continue to decrease in size until some minimum number of pixels per region is reached. Other approaches, such as beginning at the smallest pixel size and proceeding to the full image, are also permitted.

In a parallel computing environment, each successive candidate region can be fed to a different parallel process for evaluation. Other approaches are also permitted. For example, the module can be implemented in hardware running alone, without conventional software.

Second module 220 can be a CNN which takes in the resized candidate regions and classifies them as face or non-face. If a region gets classified as a face, the network can additionally provide the facial landmarks locations, estimated head pose and the gender information for the region. This module may similarly be variously constructed and implemented in software running on hardware or hardware alone. This system may provide output in the form of a report, a modified image, or any other form. The inputs for this module can include candidate regions from module 210 as well as fed back information from module 230. Module 220 can be variously implemented, for example, as illustrated in FIG. 1. Because the second module 220 may also be able to generate candidate face regions, in certain embodiments the first module 210 and second module 220 can be integrated as a single module.

Third module 230 can provide post-processing. The post-processing can include recursive region-proposals and landmarks-based k-NMS. The post processing can boost the face detection score and improve the performance of individual tasks. This module may similarly be variously constructed and implemented in software running on hardware or hardware alone. More details of the recursive region-proposals and landmarks-based k-NMS are discussed below.

Referring to FIG. 1, the network shown can be constructed by beginning with an Alexnet network for image classification. The network can include five convolutional layers along with three fully connected layers. The network can be initialized with predetermined weights, such as those used in the Imagenet Challenge with the Caffe implementation.

All the fully connected layers can be removed as they encode image-classification task specific information, which may not be desirable for face related tasks.

As mentioned above, the features in CNN can be distributed hierarchically in the network. While the lower layer features may be informative for localization tasks such as landmarks and pose estimation, the higher layer features may be suitable for more complex tasks such as detection or classification. Learning multiple correlated tasks simultaneously can build a synergy and improve the performance of individual tasks. Certain embodiments can simultaneously learn face detection, landmarks, pose and gender, for example using a fusion of the features from the intermediate layers of the network (hyperfeatures), and can learn multiple tasks on top of that fusion. Since the adjacent layers may be highly correlated, not all the intermediate layers may be considered for fusion.

Certain embodiments can fuse the max1, conv3 and pool5 layers of Alexnet, using a separate network. A naive way for fusion is directly concatenating the features. Since the feature maps for these layers have different dimensions 27×27×96, 13×13×384, 6×6×256, respectively, they cannot be concatenated directly. Therefore, add conv1a and conv3a convolutional layers can be added to pool1, conv3 layers to obtain consistent feature maps of dimensions 6×6×256 at the output. The output of these layers can then be concatenated along with pool5 to form a 6×6×768 dimensional feature map. The dimension is still quite high to train a multi-task framework. Hence, a 1×1 kernel convolution layer (conv_all) can be added to reduce the dimensions to 6×6×192. A fully connected layer (fc_full) can be to conv_all, which can output a 3072 dimensional feature vector.

The network can then be split into five separate branches corresponding to the different tasks. Fully connected layers fc_detection, fc_landmarks, fc_visibility, fc_pose, and fc_gender, each of dimension 512, can be added to fc_full. Finally, a fully connected layer can be added to each of the branches to predict the individual task labels.

After every convolution or fully connected layer, a rectified layer unit (RelU) non-linearity can be deployed. Pooling operation in the fusion network can be omitted, as such pooling may provide local invariance which may not be desired for the face landmark localization task. Task-specific loss functions can then be used to learn the weights of the network.

The network can then be trained on a data set that includes faces in real-world images with pre-annotated attributes. For testing purposes, a subset of the data can be retained to against which to test the training.

The fully connected layers fc_detection, fc_landmarks, fc_visibility, fc_pose, and fc_gender can be variously implemented to provide face detection, landmark localization, visibility, pose, and gender, respectively. For example, the detection may be implemented by any face detection mechanism such as a deep pyramidal detection mechanism as described below.

Landmark localization can be implemented using a 21 point markup for face landmark location, or any other suitable mechanism. Because the faces have full pose variations, some of the landmark points may be invisible.

A visibility factor can be determined to test the presence of a predicted landmark. The pose estimation can provide head pose estimates of roll, pitch, and yaw. Furthermore, the gender recognition can compute a perceived sex or gender of the face.

The landmark locations obtained along with the detections can permit various post processing steps that can benefit all the tasks. At least two post-processing steps are possible: recursive region proposals and landmark-based k-NMS to improve the recall performance.

For recursive region proposals, a fast version of Selective Search can extract around 2000 regions from an image. Some faces with poor illumination or small size may fail to get captured by any candidate region with a high overlap. The network may fail to detect that face due to low score. In these situations, a candidate box that precisely captures the face may be beneficial. Hence, a new candidate bounding box from the predicted landmark points can be provided, for example using a FaceRectCalculator. The new region, being more localized, can yield a higher detection score and the corresponding tasks output, thus increasing the recall. This procedure can be repeated iteratively or recursively. FIG. 3 illustrates pseudo-code of a recursive or iterative region proposal, according to certain embodiments.

Regarding landmarks-based k-NMS, the traditional way of nonmaximum separation involves selecting the top scoring region and discarding all the other regions with overlap more than a certain threshold. This method can fail in the following two scenarios. First, if a region corresponding to the same detected face has less overlap with the highest scoring region, it can be detected as a separate face. Second, the highest scoring region might not always be localized well for the face, which can create some discrepancy if two faces are close together. To overcome these issues, NMS can be performed on a new region whose bounding box is defined by the boundary co-ordinates as [$\min_i x_i$, $\min_i y_i$, $\max_i x_i$, $\max_i y_i$]. In this way, the candidate regions would get close to each other, thus decreasing the ambiguity of the overlap and improving the face localization.

Landmarks-based k-NMS can be applied to keep the top k boxes, based on the detection scores. The detected face can correspond to the region with maximum score. The landmark points, pose estimates and gender classification scores can be decided by the median of the top k boxes obtained. Hence, the predictions do not rely only on one face region, but can consider the votes from top k regions for generating the final output. For example, the value of k may be 5. FIG. 4 illustrates pseudo-code of landmarks-based NMS, according to certain embodiments.

FIG. 5a illustrates an R-CNN-based network architecture for face detection, FIG. 5b illustrates an R-CNN-based network architecture for landmark localization, FIG. 5c illustrates an R-CNN-based network architecture for pose estimation, and FIG. 5d illustrates an R-CNN-based network architecture for gender recognition, according to certain embodiments. The numbers on the left denote the kernel size and the numbers on the right denote the cardinality of feature maps for a given layer. These are just examples of networks that can be used.

Figure 6:
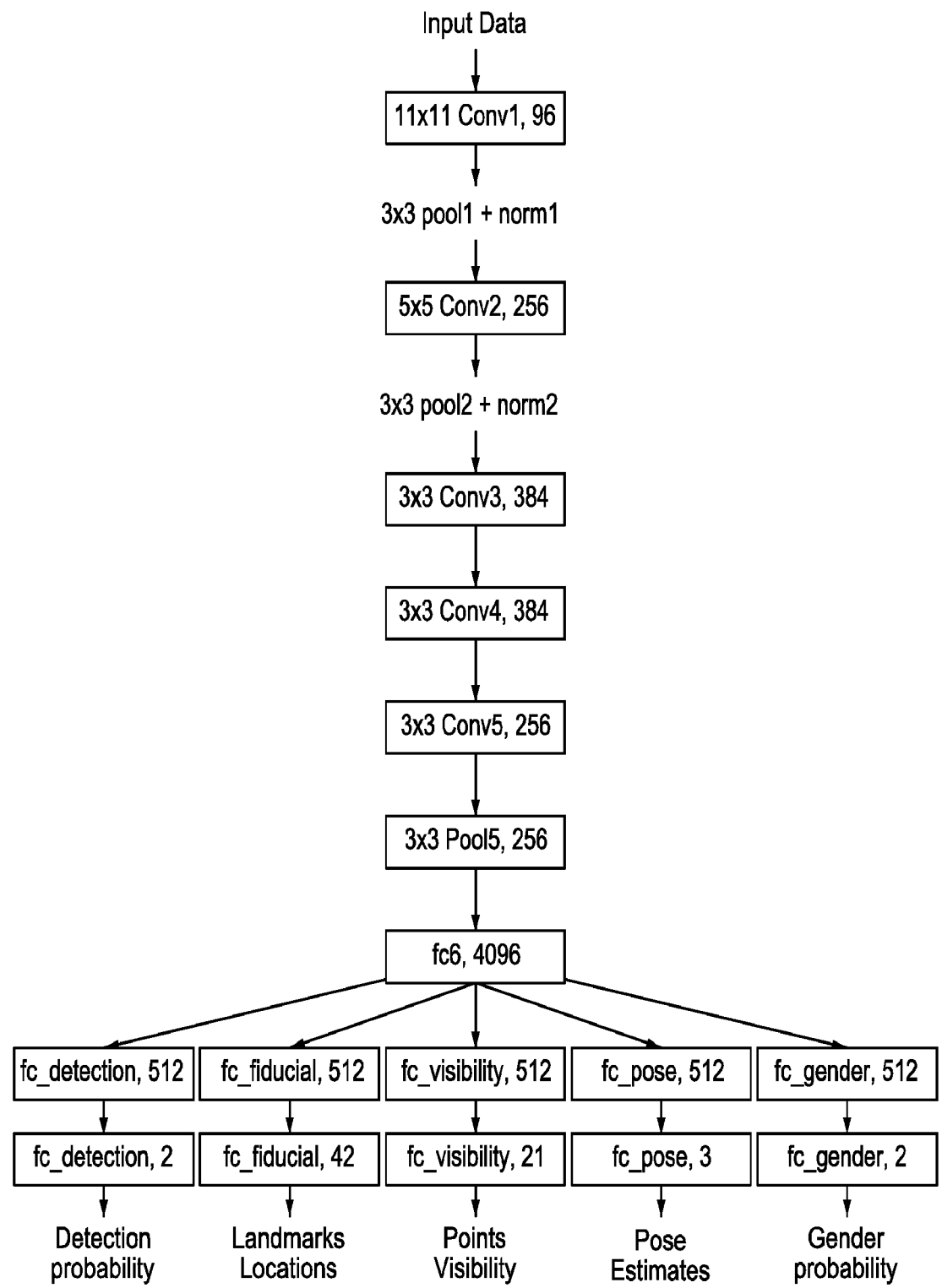
FIG. 6 illustrates a network architecture for Multitask Face.

FIG. 6 illustrates a network architecture for Multitask Face. The numbers on the left denote the kernel size and the numbers on the right denote the cardinality of feature maps for a given layer. Similar to HyperFace, this model can be used to simultaneously detect face, localize landmarks, estimate pose and predict its gender. The main difference between Multitask Face and HyperFace is that HyperFace can fuse the intermediate layers of the network whereas Multitask Face can combine the tasks using the common fully connected layer at the end of the network as shown in FIG. 6. Since it provides the landmarks and face score, Multitask Face can leverage iterative region proposals and landmark-based NMS post-processing algorithms during evaluation.

Figure 7:
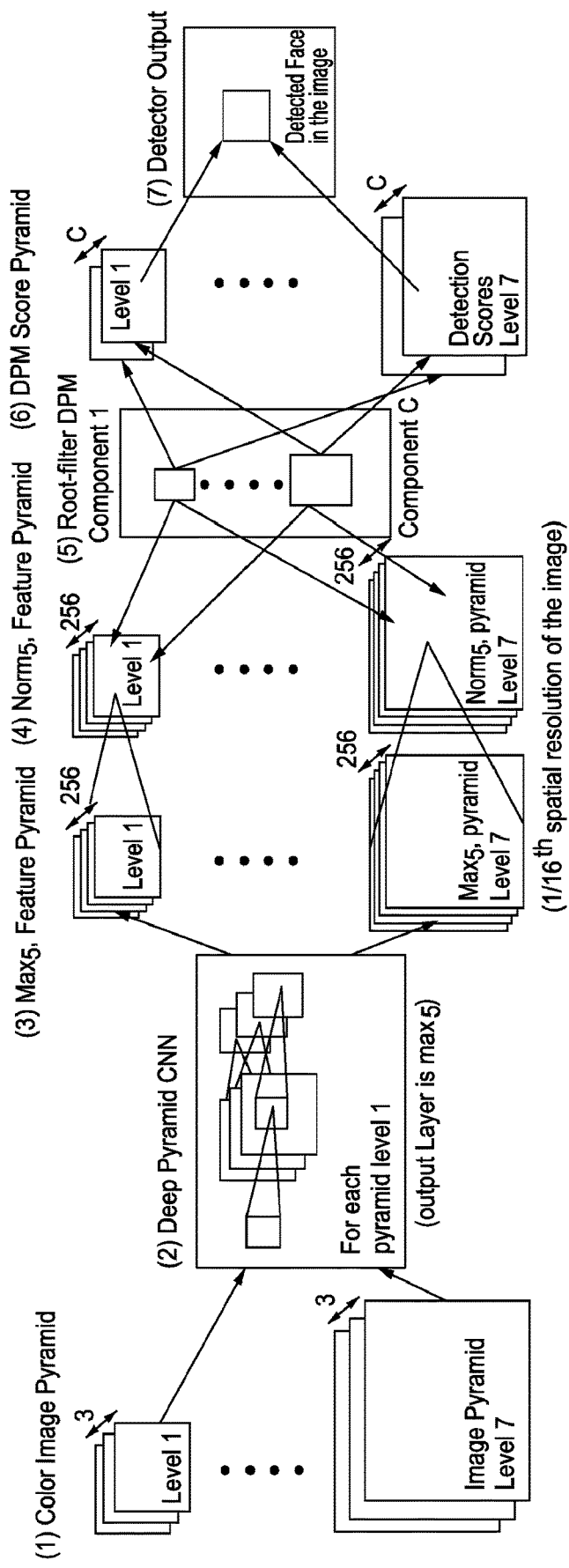
FIG. 7 illustrates a deep pyramidal deformable part model for face detection, according to certain embodiments.

FIG. 7 illustrates a deep pyramidal deformable part model for face detection, according to certain embodiments. As shown in FIG. 7, an image pyramid can be built from a color input image with level 1 being the lowest size. Each pyramid level can be forward propagated through a deep pyramid CNN that ends at max variant of convolutional layer 5 (max5). The result can be a pyramid of max5 feature maps, each at 1/16th the spatial resolution of its corresponding image pyramid level. Each max5 level feature can be normalized using z-score to form a norm5 feature pyramid. Each norm5 feature level can get convoluted with every root-filter of a C-component DPM to generate a pyramid of DPM score. The detector can output a bounding box for face location in the image after non-maximum suppression and bounding box regression. The inclusion of a normalization layer can help reduce bias in face sizes.

Figure 8:
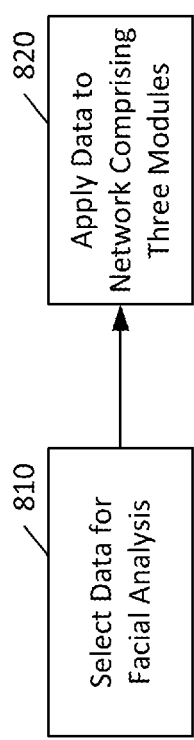
FIG. 8 illustrates a method according to certain embodiments.

FIG. 8 illustrates a method according to certain embodiments. As shown in FIG. 8, a method can include, at 810, selecting a set of data for facial analysis. The method can also include, at 820, applying the set of data to a network comprising at least three modules. A first module of the at least three modules can be configured to generate class independent region proposals to provide a region. A second module of the at least three modules can be configured to classify the region as face or non-face using a multi-task analysis. A third module of the at least three modules can be configured to perform post-processing on the classified region.

The method of FIG. 8 can be variously implemented in one or more processor and one more memory as with the other modules and processes described above. Processors may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
a first module of at least three modules, wherein the first module configured to generate class independent region proposals to provide a region;
a second module of the at least three modules is configured to classify the region as face or non-face using a multi-task analysis,
wherein the second module comprises a five convolutional layers with three fully connected layers, a network configured to fuse the three fully connected layers, separate networks for face detection, landmark detection, visibility determination, pose estimation, and gender determination; and
a third module of the at least three modules is configured to perform post-processing on the classified region.

2. The apparatus of claim 1, wherein the third module comprises at least one of an iterative region proposal or landmark-based non-maximum suppression.

3. An apparatus, comprising:
at least one processor; and
at least one memory including computer program instructions,
wherein the at least one memory and the computer program instructions are configured to
select a set of data for facial analysis; and
apply the set of data to a network comprising at least three modules,
wherein a first module of the at least three modules is configured to generate class independent region proposals to provide a region,
wherein a second module of the at least three modules is configured to classify the region as face or non-face using a multi-task analysis,
wherein the second module comprises a five convolutional layers with three fully connected layers, a network configured to fuse the three fully connected layers, and separate networks for face detection, landmark detection, visibility determination, pose estimation, and gender determination; and
wherein a third module of the at least three modules is configured to perform post-processing on the classified region.

4. The apparatus of claim 3, wherein the third module comprises at least one of an iterative region proposal or landmark-based non-maximum suppression.

5. A method, comprising:

selecting a set of data for facial analysis; and applying the set of data to a network comprising at least three modules, wherein a first module of the at least three modules is configured to generate class independent region proposals to provide a region, wherein a second module of the at least three modules is configured to classify the region as face or non-face using a multi-task analysis, wherein the second module comprises a five convolutional layers with three fully connected layers, a network configured to fuse the three fully connected layers, and separate networks for face detection, landmark detection, visibility determination, pose estimation, and gender determination, and wherein a third module of the at least three modules is configured to perform post-processing on the classified region.

6. The method of claim 5, wherein the third module comprises at least one of an iterative region proposal or landmark-based non-maximum suppression.

7. An apparatus, comprising:

means for selecting a set of data for facial analysis; and means for applying the set of data to a network comprising at least three modules, wherein a first module of the at least three modules is configured to generate class independent region proposals to provide a region, wherein a second module of the at least three modules is configured to classify the region as face or non-face using a multi-task analysis, wherein the second module comprises a five convolutional layers with three fully connected layers, a network configured to fuse the three fully connected layers, and separate networks for face detection, landmark detection, visibility determination, pose estimation, and gender determination, and wherein a third module of the at least three modules is configured to perform post-processing on the classified region.

8. The apparatus of claim 7, wherein the third module comprises at least one of an iterative region proposal or landmark-based non-maximum suppression.

* * * * *